United States Patent
Willie et al.

(10) Patent No.: US 8,328,077 B1
(45) Date of Patent: Dec. 11, 2012

(54) PV CELL MASS REFLOW

(75) Inventors: Dennis Willie, San Jose, CA (US);
Chris Stratas, Burlingame, CA (US);
David Geiger, Dublin, CA (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/286,295

(22) Filed: Nov. 1, 2011

(51) Int. Cl.
*B23K 31/02* (2006.01)

(52) U.S. Cl. ........................... 228/246; 228/212

(58) Field of Classification Search .................. None
See application file for complete search history.

(56) References Cited

U.S. PATENT DOCUMENTS

| | | | | |
|---|---|---|---|---|
| 3,262,694 | A * | 7/1966 | O'Farrell | 269/153 |
| 4,131,755 | A * | 12/1978 | Keeling et al. | 136/244 |
| 4,227,298 | A * | 10/1980 | Keeling et al. | 29/837 |
| 4,542,258 | A * | 9/1985 | Francis et al. | 136/256 |
| 4,836,861 | A * | 6/1989 | Peltzer et al. | 136/246 |
| 2002/0134422 | A1* | 9/2002 | Bauman et al. | 136/244 |
| 2002/0139415 | A1* | 10/2002 | Shimizu et al. | 136/256 |
| 2007/0226995 | A1* | 10/2007 | Bone | 29/832 |
| 2008/0061111 | A1* | 3/2008 | Kiriyama | 228/47.1 |
| 2008/0185034 | A1* | 8/2008 | Corio | 136/246 |
| 2008/0223429 | A1* | 9/2008 | Everett et al. | 136/244 |
| 2008/0237300 | A1* | 10/2008 | Katayama et al. | 228/46 |
| 2009/0035894 | A1* | 2/2009 | Bone | 438/121 |
| 2009/0056784 | A1* | 3/2009 | Reinisch | 136/244 |
| 2009/0064994 | A1* | 3/2009 | Weatherby et al. | 126/700 |
| 2009/0126774 | A1* | 5/2009 | Taylor et al. | 136/244 |
| 2009/0159127 | A1* | 6/2009 | Lee et al. | 136/259 |
| 2009/0272419 | A1* | 11/2009 | Sakamoto et al. | 136/244 |
| 2010/0018565 | A1* | 1/2010 | Funakoshi | 136/244 |
| 2010/0163098 | A1* | 7/2010 | Clemens et al. | 136/246 |
| 2010/0200058 | A1* | 8/2010 | Funakoshi | 136/256 |
| 2010/0263718 | A1* | 10/2010 | Abiko | 136/252 |
| 2010/0294364 | A1* | 11/2010 | Chan et al. | 136/259 |
| 2010/0307565 | A1* | 12/2010 | Suga | 136/246 |
| 2011/0155203 | A1* | 6/2011 | Funakoshi | 136/244 |
| 2011/0155243 | A1* | 6/2011 | Okamoto | 136/259 |
| 2011/0155790 | A1* | 6/2011 | Reinisch | 228/44.7 |
| 2011/0162714 | A1* | 7/2011 | Futawatari | 136/259 |
| 2011/0192826 | A1* | 8/2011 | Von Moltke et al. | 219/121.64 |
| 2011/0285840 | A1* | 11/2011 | Benson et al. | 348/87 |
| 2011/0308609 | A1* | 12/2011 | Sampsell | 136/259 |

FOREIGN PATENT DOCUMENTS

| | | | |
|---|---|---|---|
| DE | 10210521 A1 | * | 9/2003 |
| DE | 102008015383 A2 | * | 9/2009 |
| WO | WO-2010027265 A2 | * | 3/2010 |

* cited by examiner

*Primary Examiner* — Kiley Stoner
(74) *Attorney, Agent, or Firm* — Volpe and Koenig, P.C.

(57) ABSTRACT

In one embodiment, a method for soldering photovoltaic solar cells includes providing a first and second PV cell, a holder, soldering ribbon and a mass reflow oven. The method further includes placing the soldering ribbon in a fixture groove in the holder. The method further includes placing the first and second PV cell in the holder such that the soldering ribbon is position in a desired position on the first and second PV cell. The method further includes placing the holder and the first and second PV cell with the soldering ribbon into the mass reflow oven. The method further includes heating the holder and the first and second PV cell with the soldering ribbon in the mass reflow oven to solder the first and second PV cell. The method further includes cooling the holder and the first and second PV cell with the soldering ribbon.

2 Claims, 3 Drawing Sheets

PV CELL MASS REFLOW

BACKGROUND

Photovoltaic Cells (PV cells) are used in a variety of contexts for providing power to various systems. In many cases PV Cells come preformed in a certain size and shape. It may be therefore desirable to interconnect multiple PV Cells.

In many cases this is done using manual or automated soldering. Elimination of high value Automated Tab/String Soldering equipment and manual hand soldering tab and string operator labor may reduce capital equipment costs, hand or machine soldering labor head counts and related costs. Most operators currently use hand solders or automatically Solders single ribbons onto c-Si PV Cells. These methods have high variation in output due to human variation or have high costs associated with capital, power and maintenance. Hand, Infra-Red, Laser, Convection, Conduction and Soft Touch Soldering are all methods currently used today by companies to either manually or automatically solder tabbing ribbons to PV Cells in a single piece by piece singular fashion. These range from a table top application to large soldering units mounted within an enclosure or machine.

High Capital, Energy and Maintenance Costs . . . Assumption that the machines must have high process controls, mechanical tolerances, electrical features, inspections and alignment mechanisms. Manual soldering assembly and handling of PV Cells creates a high level of stress on the Cells c-Si structure thus leading to higher breakage rates and less performance of the PV Cell.

SUMMARY

Embodiments of a PV Cell Tab/Ribbon Soldering Method may be used to join various PV Cells. By utilizing Thermal Reflow Equipment for SMT Reflow applications on PV c-Si Cells to Copper Ribbon Tabs and group PV Cells may be attached into Strings. Embodiments of a Ribbon Soldering Method would allow a mass reflow of the interconnection tabs of many c-Si PV Cells (2, 10 or 12) Cell into single long Strings up to 2100 mm. In other embodiments the interconnected number is effectively infinite within practical measures. This approach would utilize existing SMT Reflow Ovens (i.e. Convection or Infra-Red) for the purpose of mass heating within a controlled environment. The overall problem this approach solves is the need to purchase high cost automated Tabbing and Stringing Capital Equipment. This technique also induces less stress on the c-Si PV Cells with lower temperature ramp rates.

The use of a simple Ribbon and Cell alignment fixture (base+top) will also be used to hold the component together during reflow thermal soldering.

This approach solders many Ribbons to Cells in a Mass soldering approach using an SMT (Surface Mount Technology) Reflow Oven. In other methods highly precision made tooling and electromechanical features are used within machines to align, cut and place the Tabbing Ribbons in locations for soldering. Instead, a human associate is able to hand place cells and ribbons onto a fixture and index the fixture into the reflow oven allowing mass soldering instead of a single piece by piece soldering process. No machine is seen yet to mass solder all cells in single pass.

Use of existing Reflow ovens used for SMT PCBA soldering versus the machines viewed above. Industry does not use a fixture to run through an oven but simply pre-heats and solders the tabs on the cells by a solder iron, laser beam, hot air gun, induction, IR heat pulse or touch induction soldering method versus a convection oven where the entire fixture and string are heated in sequence of the conveyer speed.

In one embodiment, a method for soldering photovoltaic solar cells includes providing a first and second PV cell, a holder, soldering ribbon and a mass reflow oven. The method further includes placing the soldering ribbon in a fixture groove in the holder. The method further includes placing the first and second PV cell in the holder such that the soldering ribbon is position in a desired position on the first and second PV cell. The method further includes placing the holder and the first and second PV cell with the soldering ribbon into the mass reflow over. The method further includes heating the holder and the first and second PV cell with the soldering ribbon in the mass reflow oven to solder the first and second PV cell. The method further includes cooling the holder and the first and second PV cell with the soldering ribbon. Optionally the holder has a top and at bottom portion, the top and bottom portion having a plurality of vents and being approximately plate shaped, the bottom portion having a plurality of holding brackets for holding the first and second PV cell in place and having a plurality of fixture grooves for holding the ribbon. Optionally, the bottom portion has a rotating bracket, oriented to rotate so that it holds the top portion in place and rotate so that it does not hold the top portion in place.

In one embodiment, a fixture for holding photovoltaic solar cells for soldering in a mass reflow oven includes a top and at bottom portion, the top portion having a plurality of vents and being shaped as approximately a rectangular plate, the bottom portion having an approximately rectangular shape, vents and having a plurality of holding brackets configured to hold a first and second PV cell in place and having a plurality of fixture grooves for holding a ribbon in a position sure that it traverses the first and second PV cell.

DETAILED DESCRIPTION

Generally soldering of PV Cells is done by hand or by robotic soldering machine. Either of these methodologies are expensive and or time consuming. By properly positioning the solder ribbon on the PV Cells, apply a slight pressure and utilizing a mass reflow oven time and cost may be saved.

Figure 1:
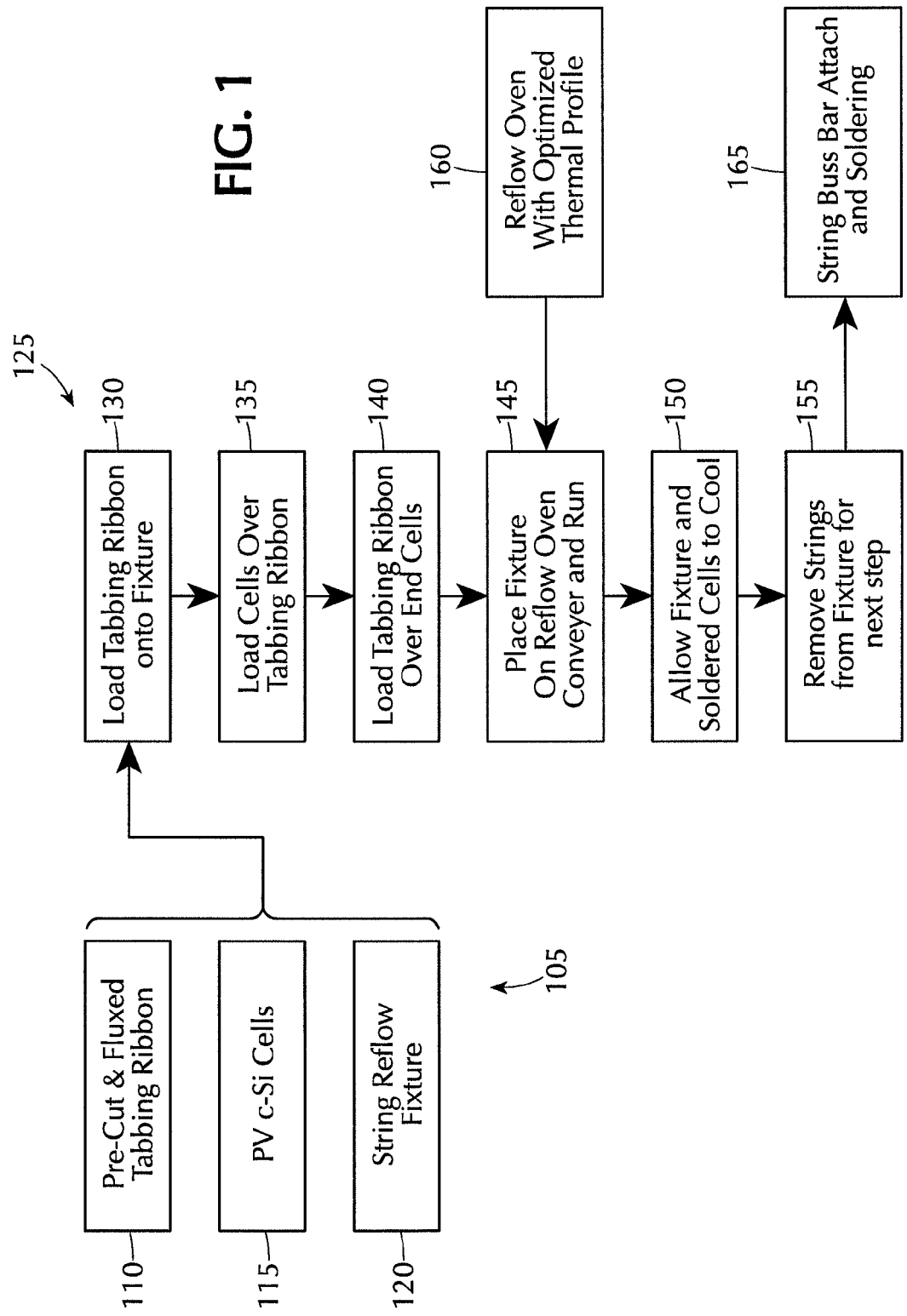
FIG. 1 shows the process flow for the ribbon to cell string soldering.

FIG. 1 shows a process flow chart for a method of Ribbon to Cell String Soldering. Input material and tools 105 are provided including pre-cut and fluxed tabbing ribbon 110, PV c-Si Cells 115, and String Reflow Fixture 120. The Sting Soldering Process Flow 125 includes Load Tabbing Ribbon onto Fixture step 130. The Tabbing Ribbon may be a low melt metal alloy selected for use with the PV Cells chosen for example, 2 mm wide×0.1 mm thick, Low Melt Alloy, Alloy=58Bi42Sn, ~140° C. Melting Point. Load Tabbing Ribbon onto Fixture step 130 as described above may be performed by a human operator or may be performed by a machine, but due to the nature of the process precise alignment in not needed. In Load Cells over Tabbing Ribbon step 135, the PV cells are placed over the tabbing ribbon. In Load Tabbing Ribbon over end cells step 140, the ribbon is placed over the PV Cells. In Reflow Oven step 145 the assembly is placed into a reflow oven on a conveyer belt and advanced where the PV Cells and ribbon are treated with heat. In Cooling step 150 the fixture and soldered cells are allowed to cool. In removal step 155 the strings are removed from the fixture to provide for cooling. In related step 160, the reflow oven may be optimized for the ideal thermal profile to provide for the attachment of the ribbons while minimizing the thermal impact of the over on the PV Cells or other heat sensitive pieces of the system. Subsequently, in the attachment step 165 the String buss bar may be attached and additional soldering may occur.

Figure 2:
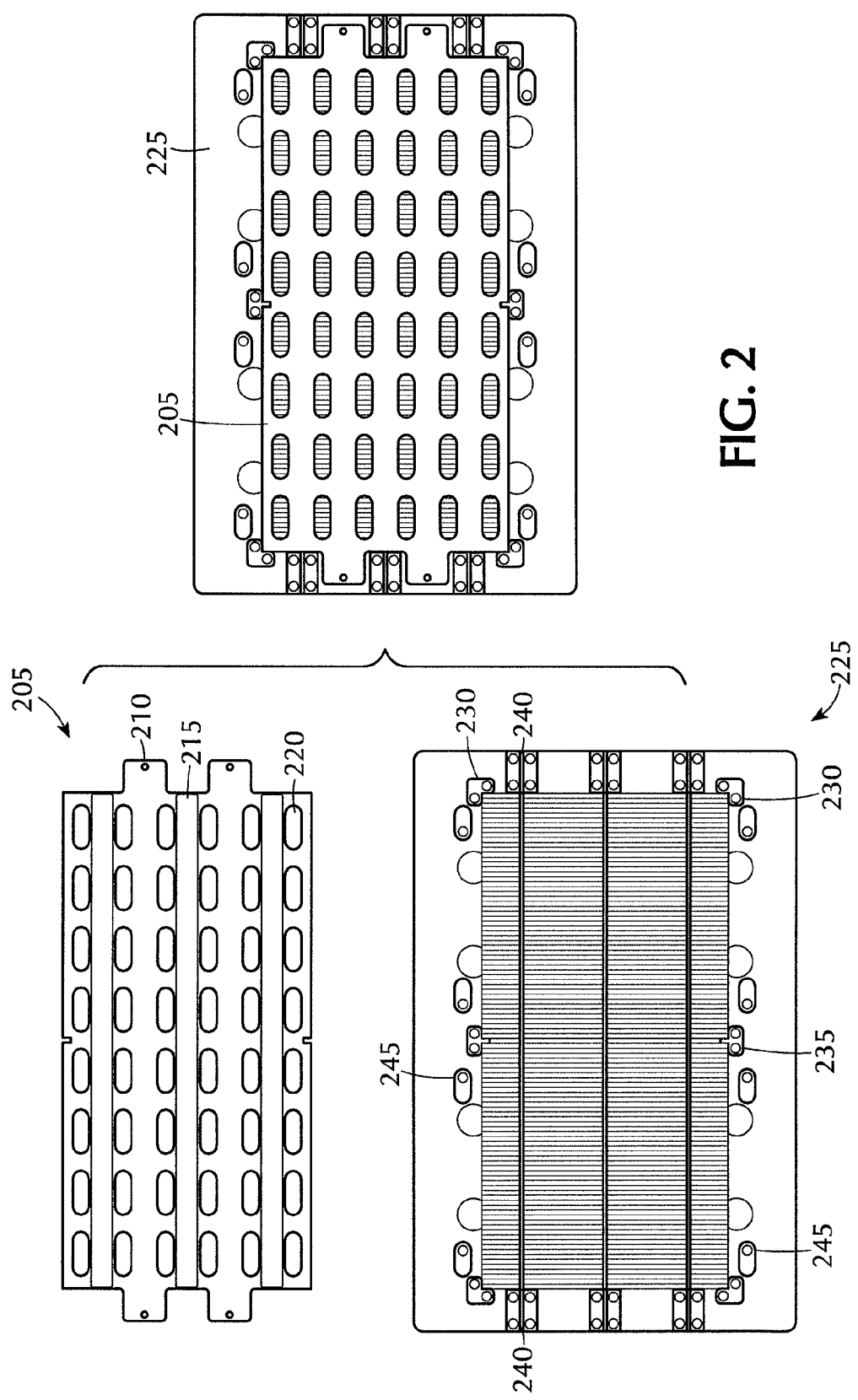
FIG. 2 shows the fixture utilized for the ribbon to cell string soldering.

FIG. 2 shows an exemplary embodiment of a bottom base fixture. Top hold down fixture 205 includes attachment holes 210 for receiving a screw, peg, or other attachment mechanism. Top hold down fixture 205 includes ribbon holding areas 215 for firmly pressing the ribbon during soldering. Some pressure may be needed to prevent lifting. In some embodiments holding areas 215 are omitted to prevent the sticking of the ribbon. Vents 220 provide for the ready transfer of heat during the reflow oven step. Top hold down fixture 205 may be made of a hi-temperature form. Bottom base fixture 225 is sized according to the PV Cells used and includes a number of positioning mechanisms for the PV Cells, ribbon and top hold down fixture 205. Brackets 230 and separators 235 provide for holding and spacing the PV Cells. Ribbon slots 240 provide holders for accurate placement of the ribbons, such that when the PV Cells are held in place by the brackets 230, the placement of the ribbon in ribbon slots 240 will be accurate. Hinged brackets 245 may be rotated to hold Top hold down fixture 205 in place. Although a specific size and shape of fixture is shown, various sizes and shapes may be used to accommodate various sizes and shape PV cells.

Figure 3:
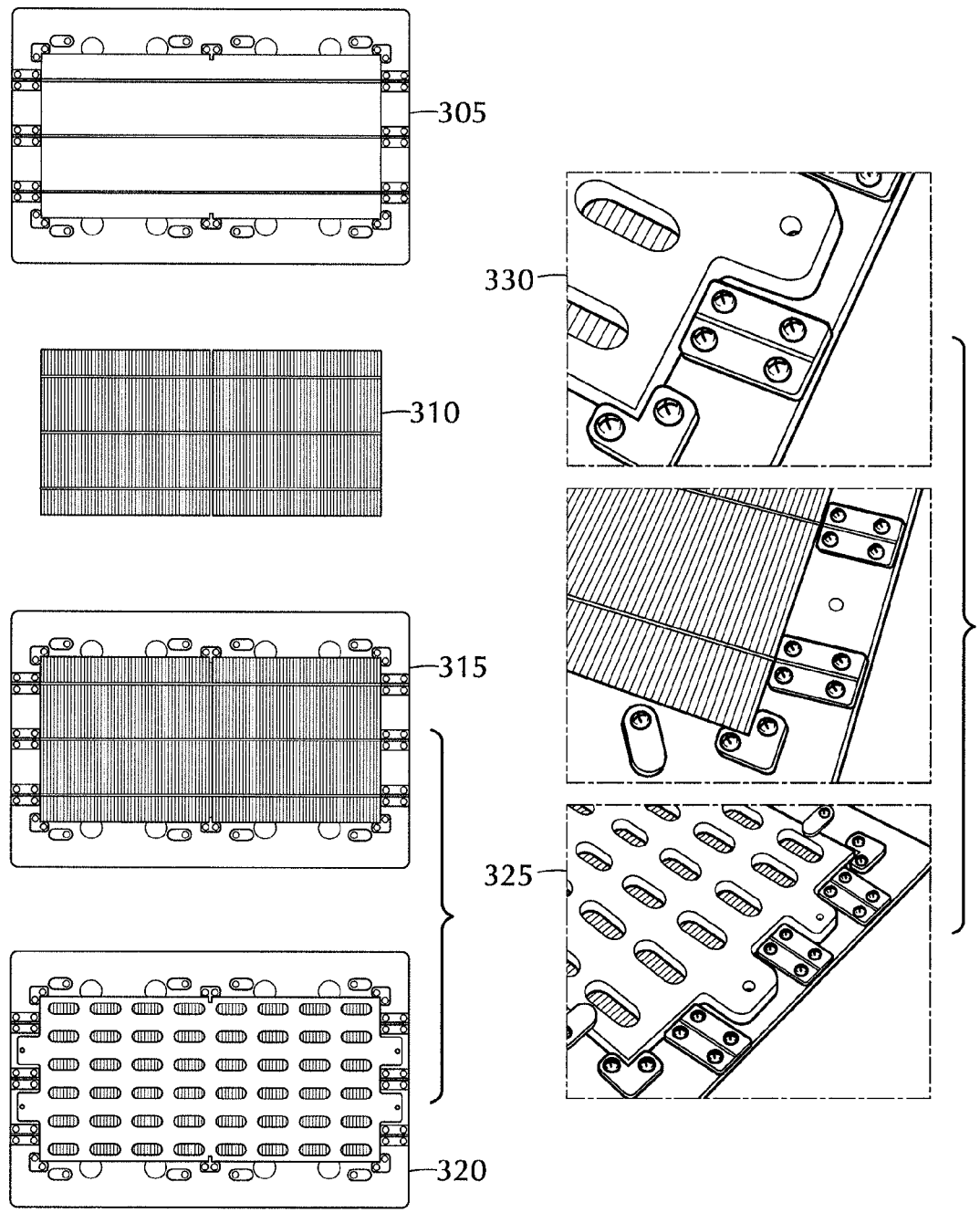
FIG. 3 shows the ribbon to cell string soldering process steps.

FIG. 3 shows a step by step process for assembling the cells and the holder. In step 305 ribbons are place in the ribbon slots 240 (or fixture grooves). Optionally, in step 310 the buss bars may be fluxed in order to improve soldering. In steps 315 and 320 the ribbons are place over and under the PV Cells. In step 325 the top hold down fixture 205 is placed over the PV Cells and held in place using the hinged brackets 245. Step 330 shows the ribbon held in place by the fixture grooves.

The embodiments described above and shown herein are illustrative and not restrictive. The scope of Ribbon to Cell String Soldering and associated systems and methods is indicated by the claims rather than by the foregoing description and attached drawings. Ribbon to Cell String Soldering may be embodied in other specific forms without departing from the spirit of Ribbon to Cell String Soldering. Accordingly, these and any other changes which come within the scope of the claims are intended to be embraced therein.

We claim:

1. A method for soldering photovoltaic solar cells, comprising:
   providing a first and second PV cell, a holder, soldering ribbon and a mass reflow oven;
   placing the soldering ribbon in a fixture groove in the holder, wherein the holder has a top and a bottom portion, the top and bottom portion having a plurality of vents and being approximately plate shaped, the bottom portion having a plurality of holding brackets for holding the first and second PV cell in place and having a plurality of fixture grooves for holding the ribbon;
   placing the first and second PV cell in the holder such that the soldering ribbon is positioned in a desired position on the first and second PV cell;
   placing the holder and the first and second PV cell with the soldering ribbon into the mass reflow oven;
   heating the holder and the first and second PV cell with the soldering ribbon in the mass reflow oven to solder the first and second PV cell; and
   cooling the holder and the first and second PV cell with the soldering ribbon.

2. The method of claim 1, wherein the bottom portion has a rotating bracket, the rotating bracket oriented to rotate so that it holds the top portion in place and rotate so that it does not hold the top portion in place.

* * * * *